Patented Aug. 30, 1949

2,480,367

UNITED STATES PATENT OFFICE 2,480,367

MANUFACTURE OF THERAPEUTIC SUBSTANCES

Charles Alfred Hill and Herbert Aubrey Stevenson, Nottingham, England, assignors to Boots Pure Drug Company Limited, Nottingham, England, a company of Great Britain No Drawing. Application November 10, 1944, Serial No. 562,920. In Great Britain November 11, 1943

7 Claims. (Cl. 260—239.6)

This invention relates to the preparation of substances suitable for use in therapy.

The compound 2:8-diaminoacridine sulphate known as proflavine has recognised antiseptic properties and is used in solution or as a dusting powder for the treatment of wounds. Its therapeutic use has, however, been restricted up to the present owing to the acidity of its solution resulting in the solution or the powdered solid material causing pain when it is used. Attempts to reduce its acidity by the addition of buffering salts have not been generally successful while the use of the base itself for such a purpose as a dusting powder is prohibited by the alkaline nature of the solution it forms in the wound.

It has now been found that certain stable compounds of the acridine antiseptic mentioned above or of 5-aminoacridine with sulphathiazole are eminently suitable for use in therapy, particularly in those cases in which solutions approaching neutrality are essential and the object of the present invention is to produce such stable compounds. The numbering of the positions for substituents on the acridine nucleus is as follows:

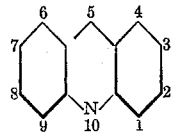

According to the invention, the compounds in question are formed by the direct action of molecular proportions of sulphathiazole and the acridine antiseptic or by the reaction of equivalent amounts of salts which give rise to those reactants on admixture. The compound formed by the mixing of solutions of sulphathiazole and the 2:8-diaminoacridine in molecular proportions is a stable body with a melting point of 195° C. and a pH value in solution of about 7.4. The nature of the combination between the two substances is not known with certainty but the new substances cannot be separated into their components by extraction with water, although if the two components are mixed together with one of them in an amount exceeding that of molecular proportions, the excess of that component over one molecular proportion may be extracted with water leaving the new compound containing equimolecular proportions of each of the components.

It is found that the new compounds exhibit bactericidal properties which are greater in respect of some organisms than the properties of one or both of the component substances.

In order that the invention may be clearly understood and readily carried into effect, some methods of carrying out the novel process will now be fully described but purely by way of example.

Example 1

In the preparation of the compound from 2:8-diaminoacridine and sulphathiazole, equimolecular proportions of those two substances are dissolved separately in boiling water, the solutions are mixed and allowed to cool or the equimolecular amounts of the two substances are boiled together in water until a solution is obtained which is filtered and allowed to cool. The compound containing diaminoacridine and sulphathiazole in equimolecular proportions separates as orange yellow crystals and on drying at 60° C. the monohydrate of the compound is obtained and melts at 129 to 131° C. On further drying at 100° C. the anhydrous compound is formed and melts at 197 to 199° C.

Example 2

In the preparation of the compound of 5-amino acridine, equimolecular proportions of the sodium salt of sulphathiazole and 5-amino acridine hydrochloride are separately dissolved in hot water and the solutions are mixed. The required compound separates immediately and is washed free from sodium chloride with water. The compound is dimorphous and after drying and recrystallisation from alcohol, it melts at 201 to 202° C. or at 215 to 217° C.

The compound obtained, after being finely powdered is of value as a dusting powder and may also be incorporated in a suitable water-miscible ointment base for therapeutic use.

It is clear that in the production of the 5-amino acridine compound that substance and sulphathiazole itself may be used as the reactants and also in the production of the compound of 2:8-diaminoacridine and sulphathiazole, equivalent amounts of salts which give rise to those reactants on admixture may be employed.

We claim:

1. Process for the production of a new compound comprising treating sulphathiazole with a member of the group consisting of 5-aminoacridine and 2:8-diaminoacridine.

2. Process as defined in claim 1 wherein the reactants are produced in situ by admixture of their salts.

3. Process comprising mixing solutions of sulphathiazole and 5-aminoacridine and recovering the compound formed by the equimolecular combination of the sulphathiazole with the 5-aminoacridine.

4. Process comprising combining in solution equimolecular proportions of sulphathiazole and 2:8-diaminoacridine and recovering the resulting compound.

5. A new compound comprising sulphathiazole combined in equal molecular proportions with an aminoacridine selected from the group consisting of 5-aminoacridine and 2:8-diaminoacridine.

6. A new compound consisting of sulphathiazole combined with 2:8-diaminoacridine in equal molecular proportions, said compound being a solid melting at 129° C. to 131° C. and having antiseptic properties.

7. A new compound consisting of sulphathiazole combined with 5-aminoacridine in equal molecular proportions, said compound being a dimorphous solid melting at 201° C. to 202° C. and 215° C. to 217° C. and having antiseptic properties.

CHARLES ALFRED HILL.
HERBERT AUBREY STEVENSON.

REFERENCES CITED

The following references are of record in the file of this patent:

UNITED STATES PATENTS

| Number | Name | Date |
|---|---|---|
| 2,145,799 | Powell | Jan. 31, 1939 |
| 2,145,800 | Stuart | Jan. 31, 1939 |
| 2,342,957 | Moore | Feb. 29, 1944 |
| 2,370,561 | Mecca | Feb. 27, 1945 |

FOREIGN PATENTS

| Number | Country | Date |
|---|---|---|
| 114,894 | Australia | Apr. 2, 1942 |

OTHER REFERENCES

Northey, Chem. Rev., vol. 27, p. 119 (Aug. 1940).
Ganapathi, Proc. Indian Acad. Sci., vol. 12-A, pp. 274–283 (Sept. 1940).
Lancet, May 6, 1944, pp. 591–595.
Jour. Amer. Med. Assoc., Sept. 2, 1944, pages 58 and 59.